(12) United States Patent
Vantrease

(10) Patent No.: US 11,478,977 B2
(45) Date of Patent: Oct. 25, 2022

(54) THERMOFORMING APPARATUS HAVING DEFORMATION SENSOR AND METHOD

(71) Applicant: Irwin Research and Development, Inc., Yakima, WA (US)

(72) Inventor: Dale L. Vantrease, Naches, WA (US)

(73) Assignee: Irwin Research and Development, Inc., Yakima, WA (US)

( * ) Notice: Subject to any disclaimer, the term of this patent is extended or adjusted under 35 U.S.C. 154(b) by 396 days.

(21) Appl. No.: 15/961,249

(22) Filed: Apr. 24, 2018

(65) Prior Publication Data

US 2019/0322030 A1 Oct. 24, 2019

(51) Int. Cl.
*B29C 51/46* (2006.01)
*B29C 51/10* (2006.01)
*B29C 51/08* (2006.01)

(52) U.S. Cl.
CPC ............ *B29C 51/46* (2013.01); *B29C 51/082* (2013.01); *B29C 51/10* (2013.01)

(58) Field of Classification Search
CPC ....... B29C 51/46; B29C 51/10; B29C 51/082; B29C 51/38; B29C 45/56; B29C 2045/56; B30B 1/26; B30B 15/0094; B30B 15/34
See application file for complete search history.

(56) References Cited

U.S. PATENT DOCUMENTS

| 3,677,675 | A | | 7/1972 | Brown |
| 4,575,947 | A | * | 3/1986 | Stauber ................. G01B 7/008 33/558 |
| 4,878,826 | A | | 11/1989 | Wendt |
| 5,002,479 | A | | 3/1991 | Brown |
| 5,385,465 | A | | 1/1995 | Greiwe et al. |
| 5,808,904 | A | * | 9/1998 | Rasmussen ......... B30B 15/0094 324/207.18 |
| 6,055,904 | A | | 5/2000 | Chun et al. |
| 6,142,763 | A | * | 11/2000 | Lee ........................ B29C 51/18 425/398 |
| 6,250,905 | B1 | | 6/2001 | Mailliet et al. |

(Continued)

FOREIGN PATENT DOCUMENTS

DE 2900801 7/1980
WO PCT/US2019/028181 6/2019

*Primary Examiner* — Francisco W Tschen
*Assistant Examiner* — Elisa H Vera
(74) *Attorney, Agent, or Firm* — Keith D. Grzelak; Wells St. John P.S.

(57) ABSTRACT

A thermoforming apparatus is provided having a pair of coacting platens, a load bearing structural member, a force applicator, and a deformation sensor. The pair of coacting platens and respective dies are configured to mate on opposed surfaces of a heated sheet of thermoformable material to form articles. The load bearing structural member is configured to carry the coacting platens and the dies in complementary closed relationship about the sheet during an article forming operation. The force applicator is carried by the structural member and configured to impart a forming load between the pair of opposed dies and platens and across the structural member during a forming operation. The deformation sensor is configured to span a first location and a second location on the structural member to detect deformation indicative of separation between the dies resulting from deformation. A method is also provided.

28 Claims, 10 Drawing Sheets

(56) References Cited

U.S. PATENT DOCUMENTS

| | | |
|---|---|---|
| 8,356,990 B2 | 1/2013 | Keeley |
| 8,434,392 B1 * | 5/2013 | Lerner .................. G01B 21/14 |
| | | 82/1.11 |
| 8,790,108 B2 | 7/2014 | Lakatos |
| 2003/0090041 A1 | 5/2003 | Nemeskeri |
| 2004/0250709 A1 * | 12/2004 | Schlepp .................... B30B 1/26 |
| | | 100/214 |
| 2008/0023861 A1 * | 1/2008 | Turng .................... B29C 45/76 |
| | | 264/40.1 |
| 2013/0049242 A1 | 2/2013 | Vantrease |
| 2013/0119584 A1 | 5/2013 | Vantrease |
| 2017/0080629 A1 * | 3/2017 | Vantrease ............... B29C 51/38 |

* cited by examiner

THERMOFORMING APPARATUS HAVING DEFORMATION SENSOR AND METHOD

CROSS REFERENCE TO RELATED APPLICATION

This application does not claim priority from any other application.

TECHNICAL FIELD

The disclosure pertains generally to thermoforming apparatus. More particularly, this disclosure relates to thermoforming machines having a differential load source configured to counteract elastic and plastic structural deformation of components for a forming machine while applying differential or pneumatic forming pressure during an article forming operation.

BACKGROUND OF THE DISCLOSURE

The use of large tonnage thermoforming frames and drive mechanisms is known where pneumatic pressure is being applied to a heated sheet of thermoformable material during an article forming operation. Where large arrays of articles are provided on die plates on a platen, the surface area subject to pneumatic pressure and/or vacuum generates very large loads on the kinematic drive linkages and frame of a thermoforming machine. Improvements are needed in order to enable forming using very large loads without requiring further increases in the size and strength of traditional frames and linkages of a thermoforming machine while mitigating forming problems resulting from elastic deformation of thermoforming machine components, particularly when forming newer plastic sheet materials and/or article geometries that require greater forming pressures and loads. Furthermore, there is a need to precisely measure and control frame and thermoforming component deformation during a forming operation.

Other aspects and implementations are contemplated.

SUMMARY OF THE INVENTION

A thermoforming machine is provided having a differential load source, or force activated platen closing mechanism wherein one or more platens can be adjusted to a specific shut height for varying tools heights and material size, can impart an over-clamp load to coin articles, and provide a differential load to compensate for deflection in a thermoforming machine by further closing the platens together to obviate or significantly mitigate the deflection, deformation and/or elastic deformation in the frame, linkages and/or components of the thermoforming machine.

According to one aspect, a thermoforming apparatus is provided having a pair of coacting platens, a load bearing structural member, a force applicator, and a deformation sensor. The pair of coacting platens and respective dies are configured to mate on opposed surfaces of a heated sheet of thermoformable material to form articles. The load bearing structural member is configured to carry the coacting platens and the dies in complementary closed relationship about the sheet during an article forming operation. The force applicator is carried by the structural member and configured to impart a forming load between the pair of opposed dies and platens and across the structural member during a forming operation. The deformation sensor is configured to span a first location and a second location on the structural member to detect deformation indicative of separation between the dies resulting from deformation.

According to another aspect, a thermoforming apparatus is provided having a load path, a pair of opposed platens and dies, and a sensor. The load path is configured to carry a load between a first location and a second location and across a counteracting load path. The pair of opposed platens and dies are respectively provided along the first location and the second location configured to engage opposed faces of a heated web of thermoformable material. The sensor is carried across the load path and configured to detect deformation between the first location and the second location from loads imparted between the dies during a forming operation.

According to yet another aspect, a method is provided for detecting deformation in a thermoforming apparatus. The method includes: providing a deformation sensor between a first location and a second location across a load path; imparting a forming load between platens and dies coacting along the first location and the second location while engaged together; and detecting deformation between the first location and the second location indicative of load path deformation of the apparatus.

BRIEF DESCRIPTION OF THE DRAWINGS

Exemplary embodiments of the various disclosures are described below with reference to the following accompanying drawings. The drawings may be considered to represent scale.

DETAILED DESCRIPTION OF THE EMBODIMENTS

This disclosure is submitted in furtherance of the constitutional purposes of the U.S. Patent Laws "to promote the progress of science and useful arts" (Article 1, Section 8).

Figure 1:
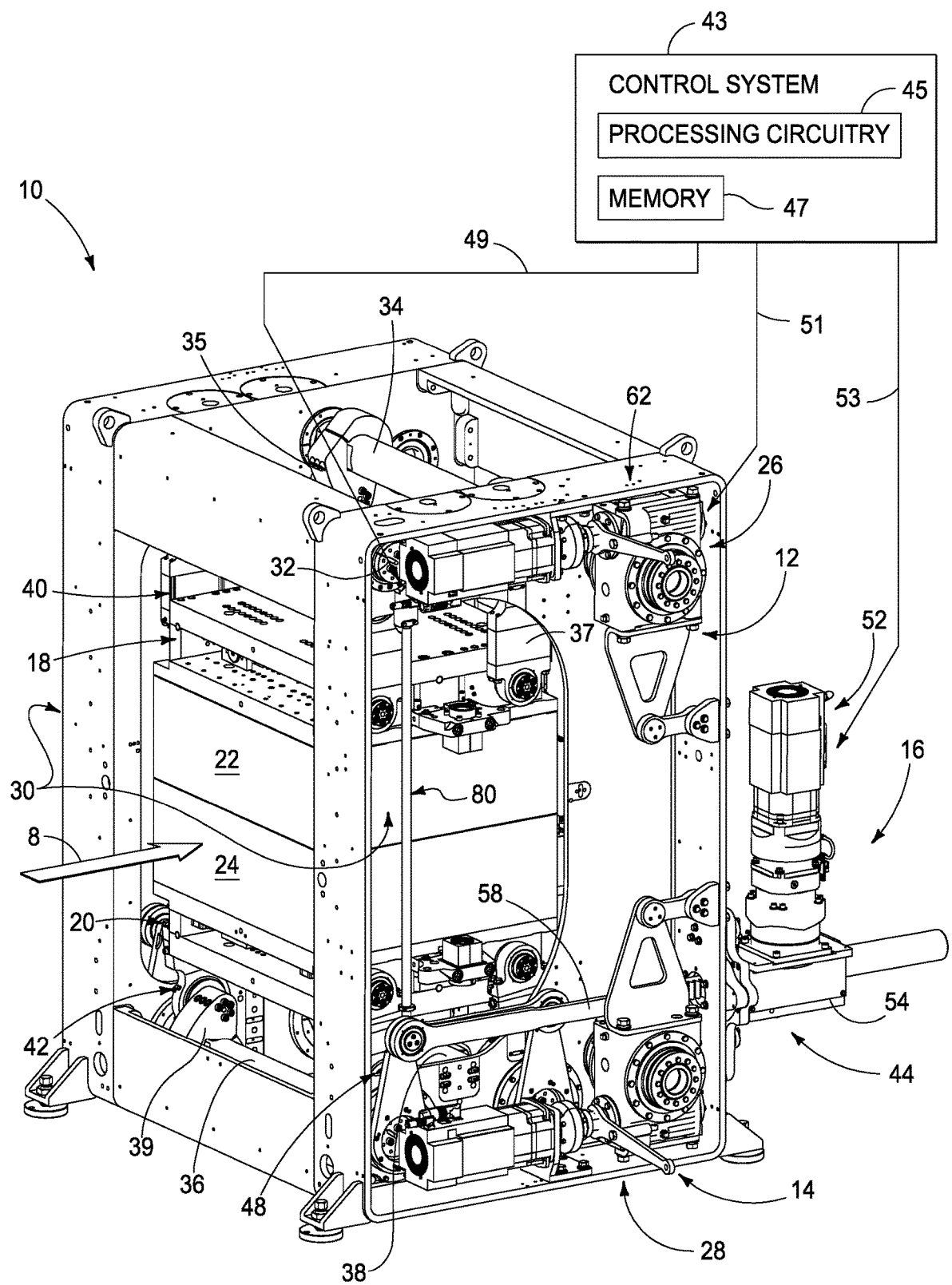
FIG. 1 is a right upstream end perspective view from above of a thermoforming machine having a differential load source with a pair of deformation sensing apparatus across the die plates and a Servo Actuated Shut Height (SASH)

FIG. 1 illustrates one suitable construction for a thermoforming machine 10 having an upper platen 18 and a lower platen 20 with a machine deformation sensing apparatus 30 having a pair of opposed sensors 80 spanning each side of platens 18 and 20. Thermoforming machines experience very high loads that can result in elastic (and plastic) deformation in frame and linkage components and there is a need to monitor and correlate such deformation in order to realize precise die plate engagement, both as to depth and parallel contact between a pair of mating die surfaces. Even furthermore, temperature changes in production plants, such as between daytime and nighttime, can affect machine geometry and accuracy between such mating die surfaces, requiring accurate measurement of such changes due to thermal material geometry changes. The present machine design has an auxiliary force, or deformation mechanism, or SASH 16 that enables adjustment of any gap between contacting die surfaces responsive to detected deformation from the deformation sensor. A control scheme can be implemented via a control system 43 to change the closing displacement and forces when closing together a pair of die plates, responsive to detected changes in machine, frame, and component geometries from measurements made by deformation sensor 80.

Although not shown in FIG. 1, it is understood that conveyor rails pass completely through thermoforming machine 10 for conveying a heated sheet of thermoformable material there through during a forming operation from an upstream end on the left to a downstream end on the right. Thermoforming machine 10 has a new differential load source, or servo actuated shut height (SASH) mechanism 16 that imparts an upward differential load to raise lower platen 20 when platens 18 and 20 are closed together during a forming operation by platen drive assemblies 12 and 14.

As shown in FIG. 1, an upper platen drive assembly 12 and 14 includes a servo motor and gearbox assembly 26 that cyclically drives upper platen 18 down and up while a lower platen drive assembly 14 includes a servo motor and gearbox assembly 28 that cyclically drives lower platen 20 up and down in synchronization within a rigid steel frame 62. Upper platen drive assembly 12 is configured with an upper servo and gear box assembly 26 that drives a cross shaft (removed for clarity) to reciprocate an upper platen drive linkage assembly via reciprocation of platen drive toggle shafts 32 and 34 to raise and lower upper platen 18. Upper platen drive assembly 12 includes a crank arm, a drive arm or link, a connecting link or follower arm, and crank arms (hidden from view in FIG. 1 on a left side), and four connecting rods 40 driven up and down via reciprocating (rotating to and fro) toggle shafts 32 and 34. Likewise, a lower platen drive assembly 14 is configured with a servo drive and lower gear box assembly 28 that drives a cross shaft (removed for clarity) to reciprocate a lower platen drive linkage assembly which reciprocates platen drive toggle shafts 36 and 38 to raise and lower platen 20. Lower platen drive assembly 28 includes a crank arm, a drive arm or link, a connecting link or follower arm, and crank arms (hidden from view in FIG. 1 on a left side), and four connecting rods 42 driven up and down via reciprocating (rotating to and fro) toggle shafts 36 and 38.

As shown, toggle shafts 32, 34, 36 and 38 are supported at each end with a rotary bearing assembly (not shown) provided in frame 62. Likewise, each end of connecting rods is affixed to a radial arm 40 and 42 on a respective toggle shaft 32, 34, 36 and 38 and one of platens 18 and 20 with a rotary bearing assembly (not shown). Furthermore, each end of a pair of follower arms connect to a respective arm on each toggle shaft 32, 34, 36 and 38 via a respective rotary bearing (not shown). Upper platen drive assembly 12 and lower platen drive assembly 214 each include a kinematic linkage for driving platens 18 and 20 between open and closed positions when carrying forming dies (not shown) driven by servo motor and gearbox assemblies 26 and 28, respectively.

A pair of vertical die posts (not shown) guide platens 18 and 20 for vertical reciprocation via respective guide bushings provided on each side of platens 22 and 24. Such guide posts 21 are removed from the present views below in order to facilitate viewing of other components of machine 10, but the guide bushings can be seen on platens 22 and 24.

Differential load source, or SASH 12 includes a right drive assembly 44 and a left drive assembly 46 that cooperate to deliver a differential load to lower platen 20 configured to counteract the effects of any load deformation to the frame 62 and components when a pneumatic load source, or forming load (or vacuum) is imparted between one of a pair of forming dies 22 and 24 and a sheet of thermoformable material during a thermoforming operation. Such a pneumatic source can impart in the range of 120 psi pressure across a top surface of a bottom die plate 24 (see FIG. 4) generating large tonnage loads between the dies 22 and 24 and platens 18 and 20, and across the frame 62. Such load deformation would otherwise lead to a slight separation between engaged dies on opposed die plates (attached to each platen) that would degrade or disable seals provided there between.

More particularly, differential load source, or SASH 12 has two mirror-image drive assemblies 44 and 46 that enable force tailoring, or adjustment of differential loads generated by each of the left and right sides of platens 18 and 20. Each drive assembly 44 and 46 includes respective drive motor assemblies 52 and 53 configured to drive in reciprocation linear rack drive units 54 and 56 that reciprocate to and fro to drive respective right and left drive linkages 48 and 50 (see FIG. 2). A pair of drive rack protective covers provide protection of workers from reciprocating drive components, or racks. A pair of die plates 22 and 24 (see FIG. 1) affix to platens 18 and 20, respectively, and a pair of die guide posts (not shown) mate with guide bushings on each die plate 22 and 24.

Respective modern rotary electric servo drive motors independently drive platen servo drive and gearbox assemblies 26 and 28, platens 18 and 20, and die plates 22 and 24. Such motors are driven by a computer control system, as is presently understood in the art. Other kinematic linkages and drive motor arrangements can be used in the alternative. Such a drive includes an AC servo motor and an associated servo drive motor controller. For example, one suitable AC servo drive motor is a SIEMENS SERVO MOTOR W/AS20DQI (1FT7108-5SC71-1BA0) sold by Siemens AG, Automation Group, Automation Systems for Machine Tools, Robots and Special—Purpose Machines, P.O. Box 31 AD, D—91050, Erlangen, Federal Republic of Germany and available in the United States at Siemens Corporation, 300 New Jersey Avenue, Suite 1000, Washington, D.C. 20001 United States. One suitable drive gearbox is a WITTENSTEIN SP+ SERIES PLANETARY GEARBOX—20:1 RATIO—W/SIEMENS 1FT7108 ADAPTER (SP240S-MF2-20-1 FT7108).

Additionally, one suitable servo drive motor controller is sold by Siemens as a digital feed drive system including a SINAMICS servo drive controller. Other controllers can also be used. Such a drive will provide a predictable motor device that can very accurately position a machine element to a desired position at a given time. Accordingly, the associated servo motor is a brushless servo motor. Using suitable control software, activation of associated machine components can also be triggered based on velocity or position of a drive, by using a velocity profile or an integrated displacement of the drive.

Figure 2:
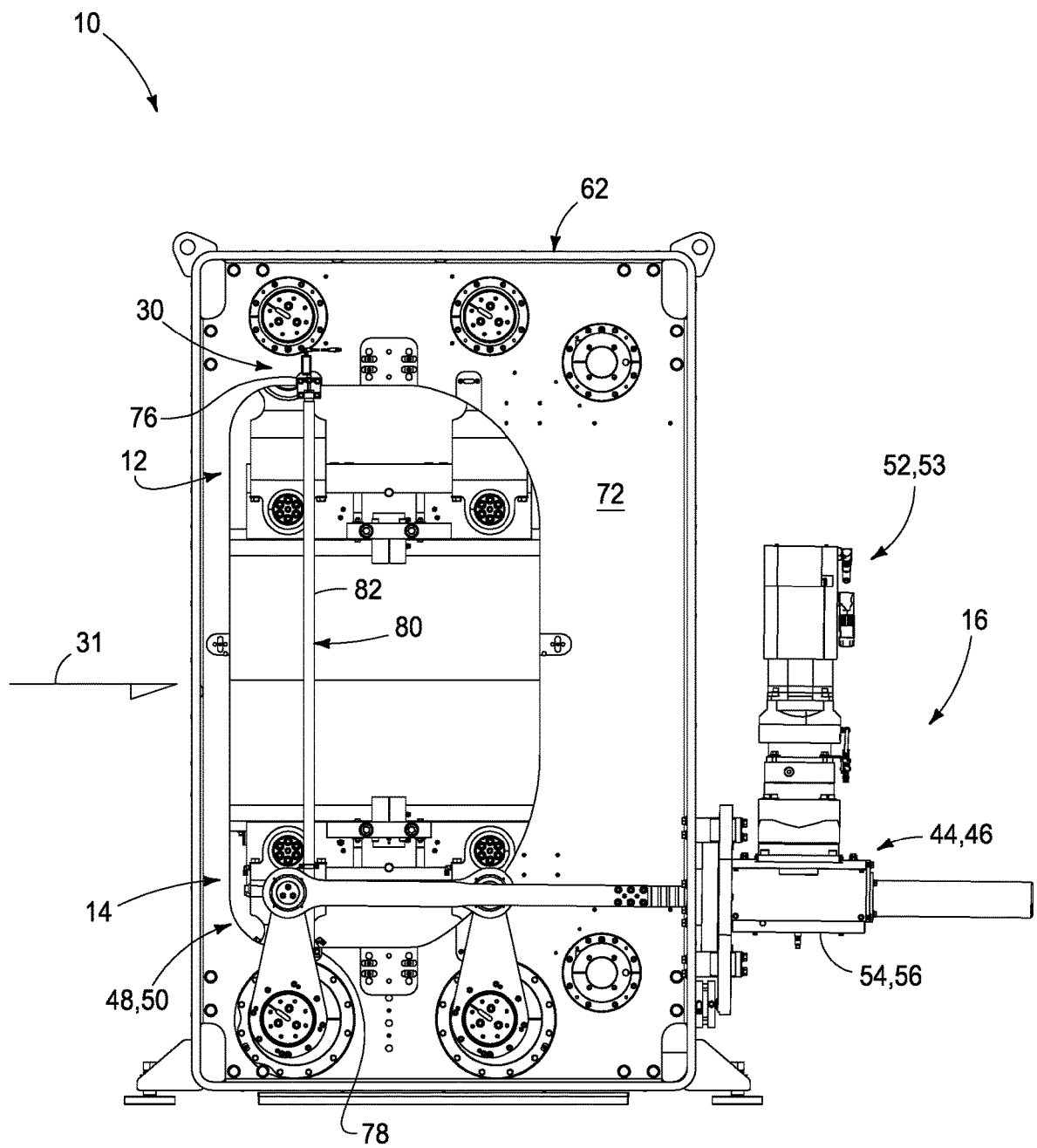
FIG. 2 is a right-side view of the thermoforming machine of FIG. 2.
Figure 3:
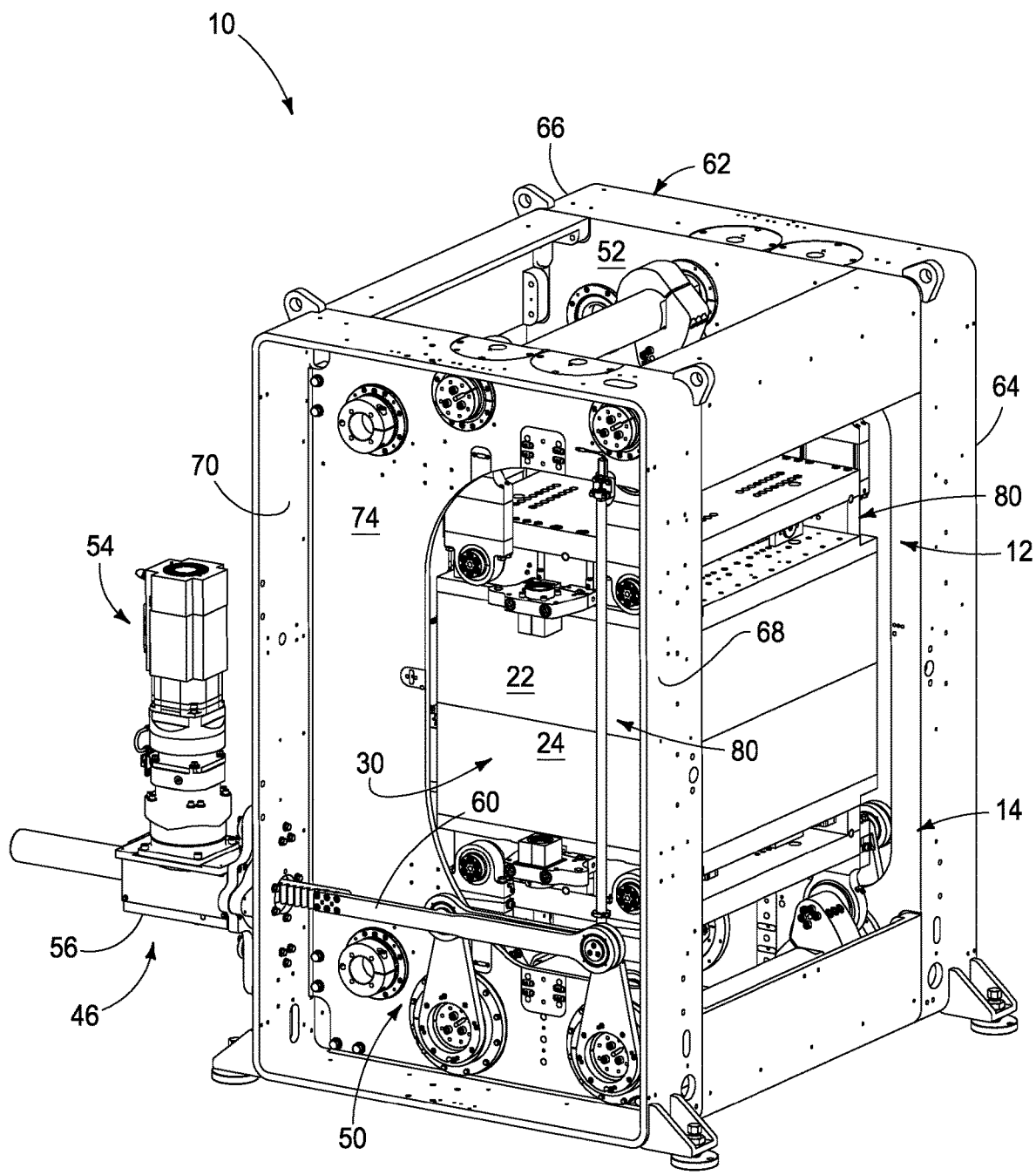
FIG. 3 is a left upstream end perspective view from above of the thermoforming machine of FIG. 1, but with the platen drive shaft, drive motors and drive linkages for reciprocating platen drive assembly removed to facilitate viewing of the differential load source and SASH.

FIGS. 1-3 illustrate thermoforming machine 10 with platens 18 and 20 in a closed position with platen 18 at a lowest position and platen 20 and a highest position. When closed together with a pair of coacting die plates 22 and 24, pressure is applied via a pneumatic pressure source through a top surface of die plate 24 that generates large tonnage loads between platens 18 and 20, as much as 120 tons or more, causing deformation of frame 62 and related drive components from drive assemblies 12 and 14. This deformation includes elongation of frame corner beams. Such deformation results in a gap between respective co-acting seals on die plates 22 and 24. However, to counteract such a gap, a differential load is generated after closing platens 18, 20 and die plates 22 and 24 (see FIG. 1) by activating differential load source, or SASH 12 to raise platen 20 upwardly via actuating of drive assemblies 48 and 50 (see FIG. 2) and drive linkages via respective drive motors. As shown in FIG. 3, drive motor assemblies 52 and 53 each drive a linear drive unit, or linear rack drive 44 and 46 that reciprocate drive linkages 48 and 50 to raise platen 20 upwardly with a differential load, or force.

Control system 43 includes processing circuitry 45 and memory 47. Processing circuitry 45 can be provided by one or more microprocessors, processors, and/or microcontrollers configured to receive a detected input signal 53 from deformation sensor 80 and generate time coordinated output signals 51 and 53 to servo motor drives on platen drive assemblies 26 and 28 and to servo motor drives on SASH drive assemblies 48 and 50.

For example, thermoforming machine 10 can be set up with a specific set of die plates 22 and 24 for forming an array of desired articles with a specific type and thickness of thermoformable sheet, such as 0.060 inch thick PET. A test forming load can be applied by machine 10 under operating conditions by generating an actual forming load, or a simulated forming load across die plates 22 and 24 and platens 18 and 20. Deformation sensor 80 is used to detect resulting elastic and/or plastic deformation of any of components on machine 10 that provide a load path, such as frame 62. According to the presently shown implementation, sensor 80 measures deformation of frame 80 between a first location 76 and a second location 78 (see FIG. 2). However, it is understood that the first location and the second location can span locations on platens 40 and 42 and/or die plates 22 and 24, or any linkage or bearing components. For example, frame 62 may not provide a load path for counteracting forming loads between die plates 22 and 24, but a set of platen locks might provide such load path as detailed in U.S. Pat. Nos. 9,649,808 and 9,811,534, herein incorporated by reference.

In operation, thermoforming machines 10 can experience very high loads that can result in elastic (and plastic) deformation in frame 62 and associated bearings, linkage components, platens, and die plates. Accordingly, there is a need to monitor and correlate such deformation in order to realize precise engagement between the adjacent contact surfaces of die plates 22 and 24, both as to depth and parallel contact between a pair of mating die surfaces. Even furthermore, temperature changes in production plants, such as between daytime and nighttime, can affect geometry of machine 10 and accuracy of shapes which manifests in resulting changes between such mating die surfaces, requiring accurate measurement of such changes due to thermal material geometry changes.

As shown in FIGS. 1-3, thermoforming machine 10 includes a pair of left and right deformation measuring apparatus 80, each affixed at a top and a bottom end to top and bottom locations on frame 64. In this manner, deformation of the load bearing members, or legs 64, 66, 68 and 70 of frame 80 in FIG. 3 can be detected accurately on the left side and the right side, enabling application of a responsive counter force, or displacement with a specific value on each side of machine 10 via linear drive units 44 and 46 of SASH 16 (see FIG. 2).

As thermoforming machine 10 forms articles in solid sheet, the forming pressure from application of form air pressure generated between the platens causes the frame and drive components to deflect away from the sheet line 8 (see FIG. 1). This deflection includes deflection of platens 18 and 20, toggle shafts 32, 34, 36 and 38, the rod ends, bearing assemblies, and the frame 62. A feedback mechanism is needed in order to determine and measure how much overall deflection occurs in the frame 62 (and other components).

Figure 4:
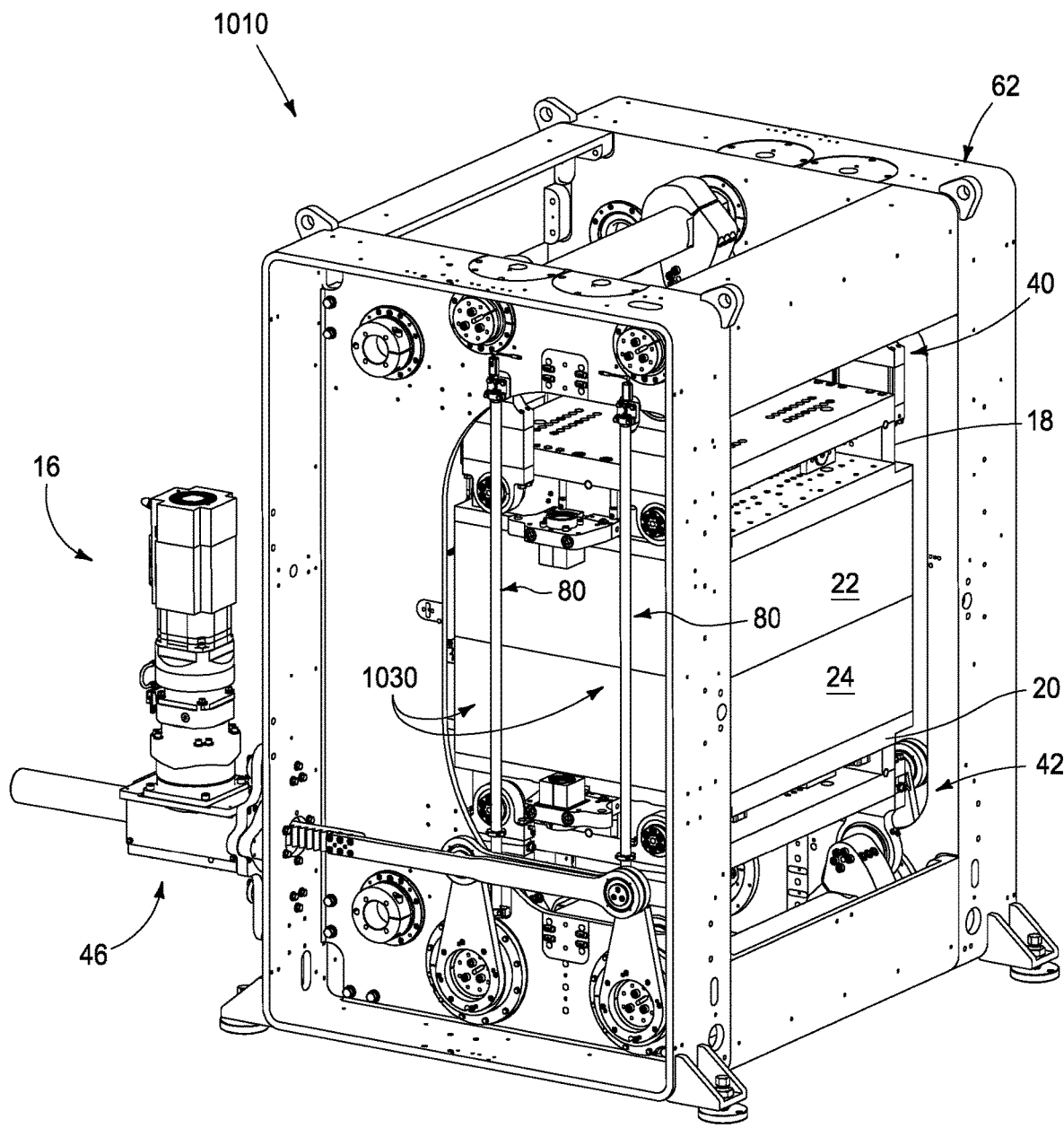
FIG. 4 is a left upstream end perspective view from above of an alternative thermoforming machine having a deformation sensing apparatus similar to that depicted in FIG. 1, but having four distinct sensing apparatus about the die plates and with the platen drive shaft, drive motors and drive linkages for reciprocating platen drive assembly removed to facilitate viewing of the differential load source and SASH.
Figure 5:
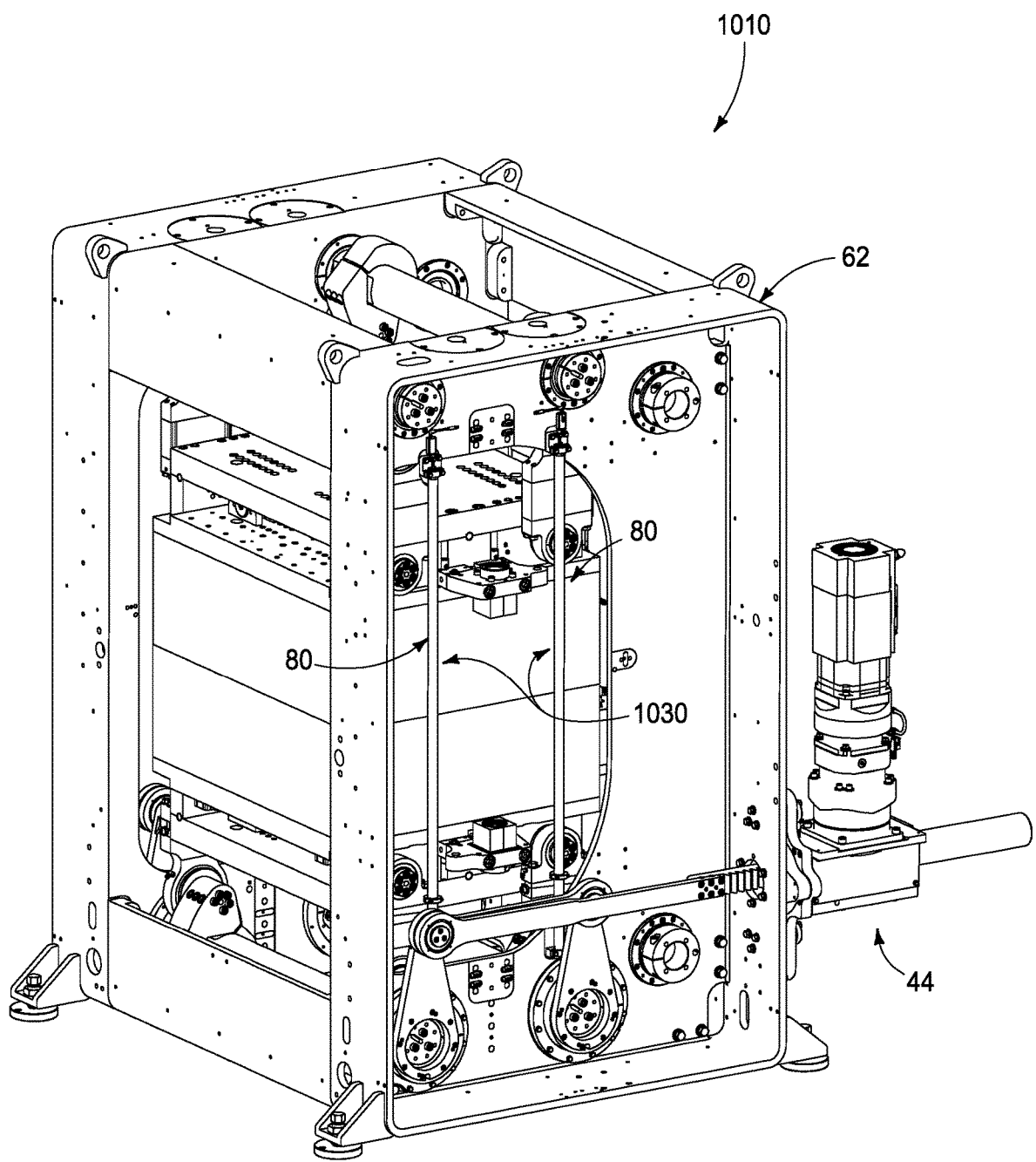
FIG. 5 is a right upstream end perspective view from above of an alternative thermoforming machine having an array of four frame deformation sensors extending the frame to bridge the platens and the platen dies assemblies.
Figure 6:
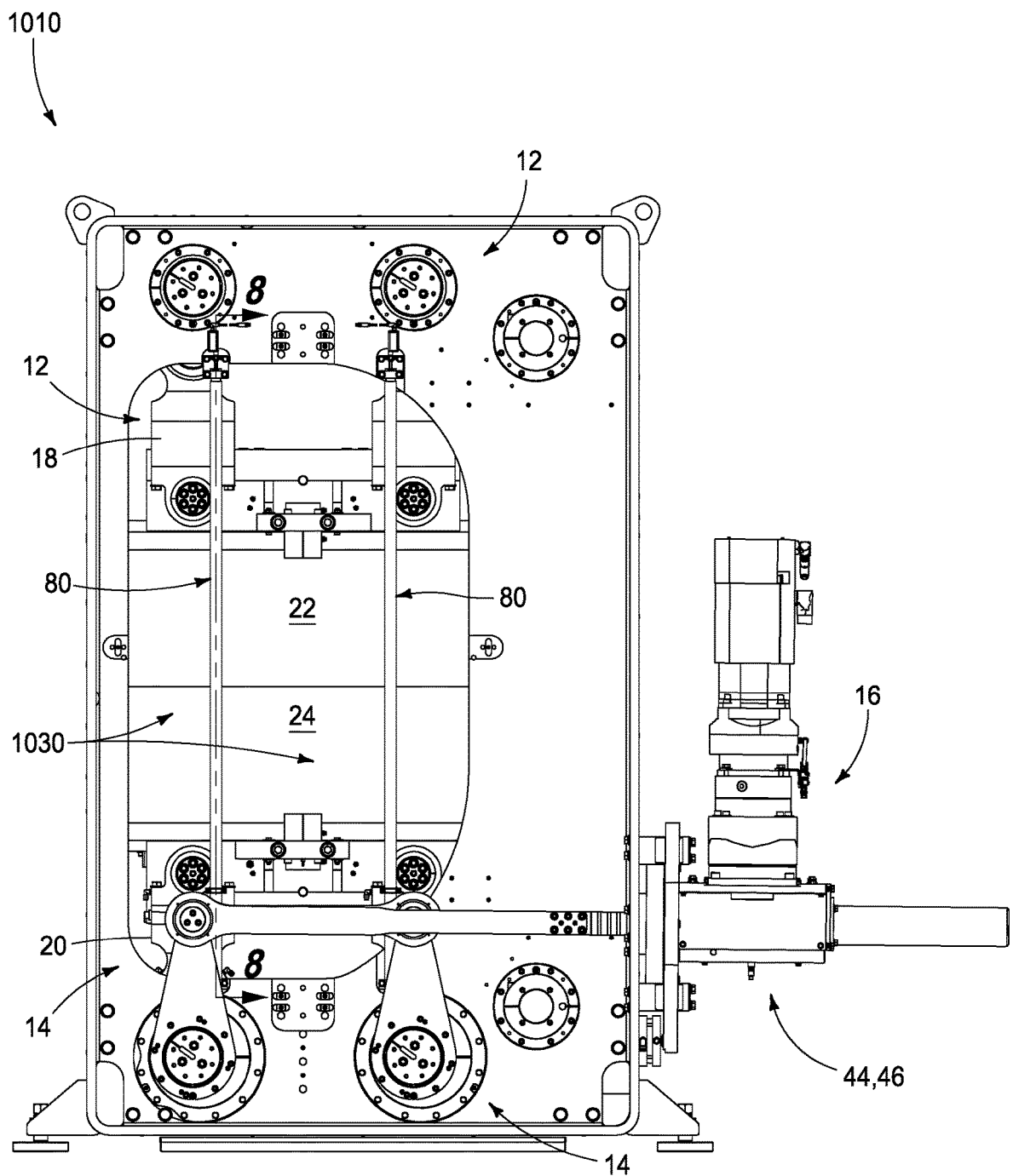
FIG. 6 is an upstream end view of the thermoforming machine of FIG. 5.

FIGS. 4-6 illustrate an alternative configuration thermoforming machine 1010 having a deformation sensing apparatus 1030 with two pairs of spaced-apart elongate deformation sensors 80, one pair provided on each side of platens 18 and 20. In operation, forming pressures are generated between adjacent contact surfaces of die plates 22 and 24, as shown in FIG. 4, which transfers large loads through platens 18 and 20 and drive arms 40 and 42 to the toggle arms, toggles shafts, and frame 62, resulting in deformation of frame 62 and associated drive components. The distributed array of sensors 80 detect resulting deformation of frame 62 and the previously described control system actuates SASH 16 to engage drive assemblies 44 and 46 (see FIG. 6). Although sensors 80 are only configured to detect deformation of frame 62, a correlation chart, or lookup table can be constructed via testing that enables adjustment to account for deformation from the remaining drive components, platens and die plates, and the displacement that is driven by the control system can be adjusted based solely on the measured deformation of frame 62 so that SASH 16 generates a counter-displacement that obviates not only the deformation of frame 62 for a given forming load and environmental conditions (such as temperature), but also obviates deformation from the remaining drive components, bearings, platens, and die plates. Once determined, thermoforming machine 1010 can be run with the control system to produce cyclical, intermittent closing and opening of die plates 22 and 24 and platens 18 and 20 via computer controlled activation of platen drive assemblies 12 and 14.

Figure 7:
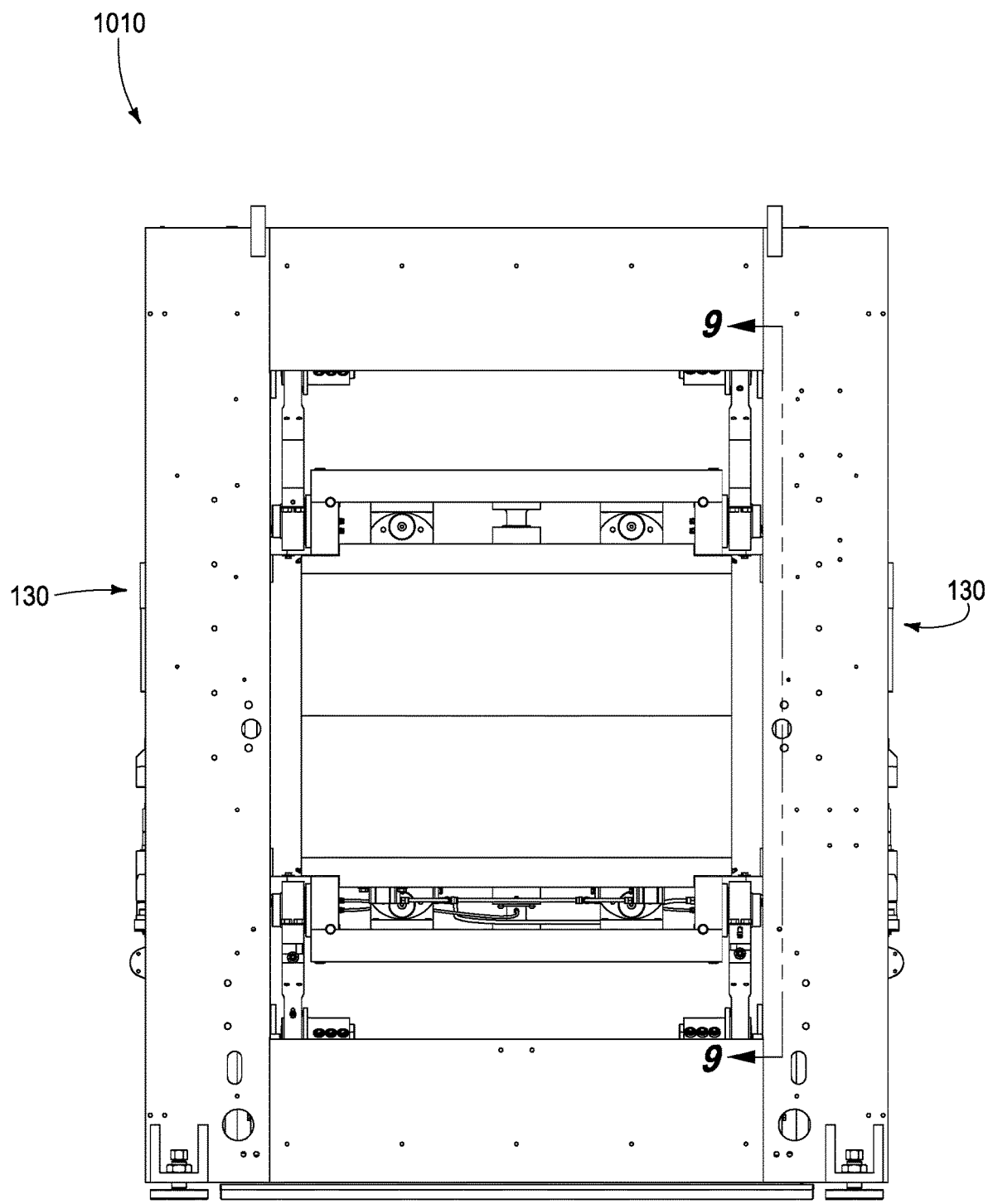
FIG. 7 is top view of the thermoforming machine of FIG. 5.

FIG. 7 illustrates an upstream end view of thermoforming machine 1010 showing the left side and right side distributed locations for deformation sensing apparatus 1010 about frame 62. It is understood that both pairs of sensor assemblies forming deformation sensing apparatus 1010 provide a total of four unique inputs to control system 43 (see FIG. 1).

Figure 8:
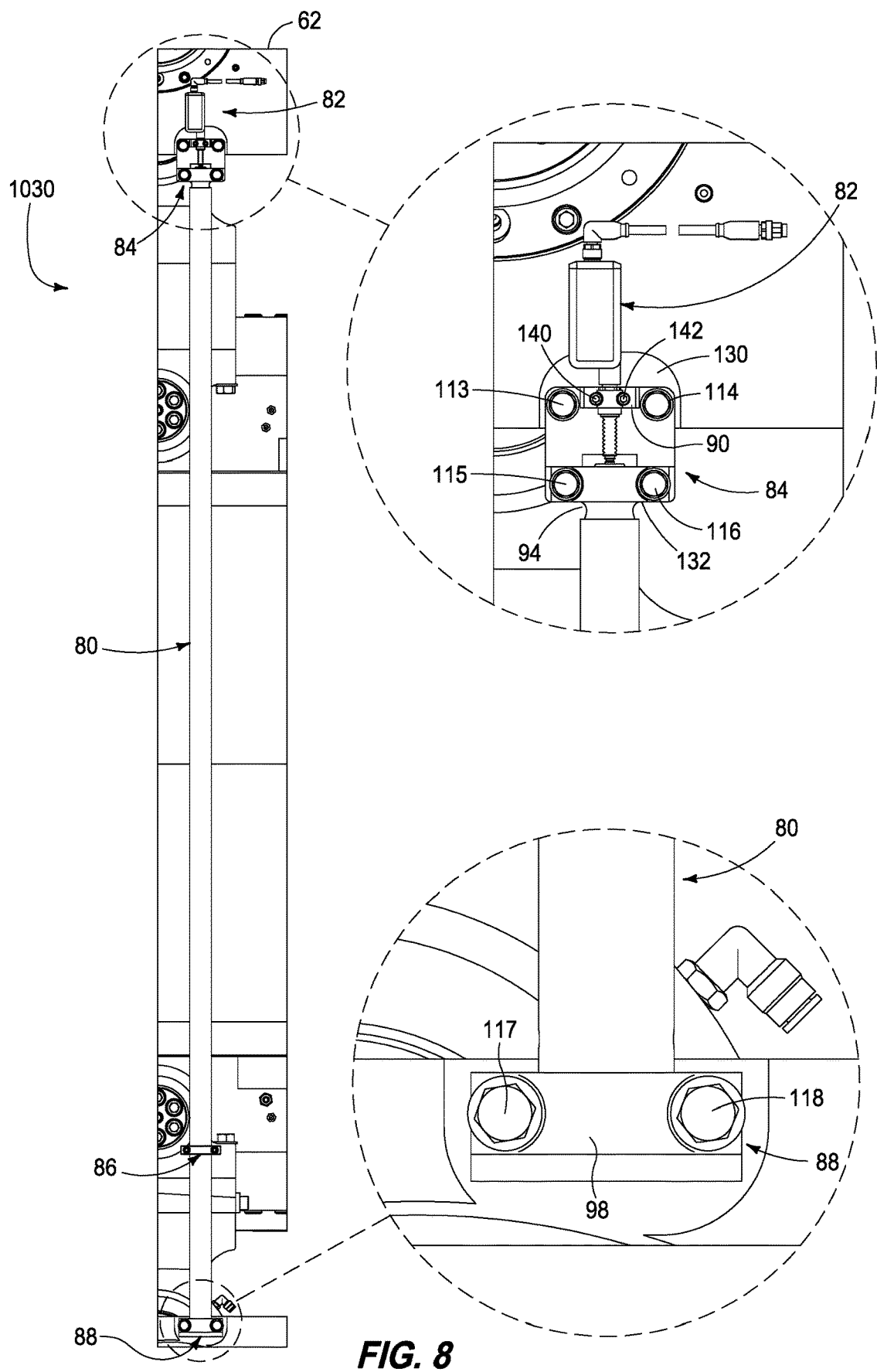
FIG. 8 is a vertical right side partial view of the left-most deformation sensor assembly shown in FIG. 6 including enlarged circled end regions.

FIG. 8 shows a vertical right side partial view of the left-most sensor assembly 80 of deformation sensing apparatus 1030 shown in FIG. 6 including enlarged circled top and bottom end regions. More particularly, sensor assembly 80 includes a physical displacement sensor 82, an elongate cylindrical tubular housing 97, an internal carbon cylindrical rod 96 (see FIGS. 9 and 10), a floating rod mounting bracket 84, a hand clamp collar 86, and a lower fixed rod end mounting bracket 86. Tube 97 has a fixed alignment guide affixed in a top end bore of tube 97 and a threaded adjustment nut 99 (see FIG. 10) affixed adjustably in a bottom end bore of tube 97. As shown in FIG. 8, a mounting bracket 84 fixes alignment guide 94 and tube 97 adjacent a top end of tube 97 to frame 62. Mounting bracket 86 fixes nut 99 (see FIG. 10) and tube 97 on a bottom end of tube 97 to frame 62.

As shown in the top enlarged top end view of FIG. 8, mounting bracket 84 includes a clamp base 130 and a pair of clamp collars 90 and 132. Collar 90 is secured with a pair of spaced-apart threaded fasteners, or bolts 140 and 142 to base 130 to secure a linear variable differential transformer (LVDT) displacement sensor 82 to base 130 and frame 62. Collar 132 is secured with a pair of spaced-apart threaded fasteners, or bolts 115 and 116 to base 130 to secure alignment guide 9 and tube 97 to base 130 and frame 62. Base 130 is secured to frame 62 with a pair of spaced-apart threaded fasteners, or bolts 113 and 114 that are received through bores (not shown) in base 130 and into corresponding threaded bores (not shown) in frame 62.

As shown in the bottom enlarged bottom end view of FIG. 8, mounting bracket 88 is secured to frame 62 adjacent a bottom end of sensor assembly 80 with a pair of threaded fasteners, or bolts 117 and 118. Bolts 117 and 118 are received through spaced-apart bores in a collar 98 and into a pair of complementary threaded bores in frame 62 that affixes a bottom end of sensor assembly 80 to frame 62.

Figure 9:
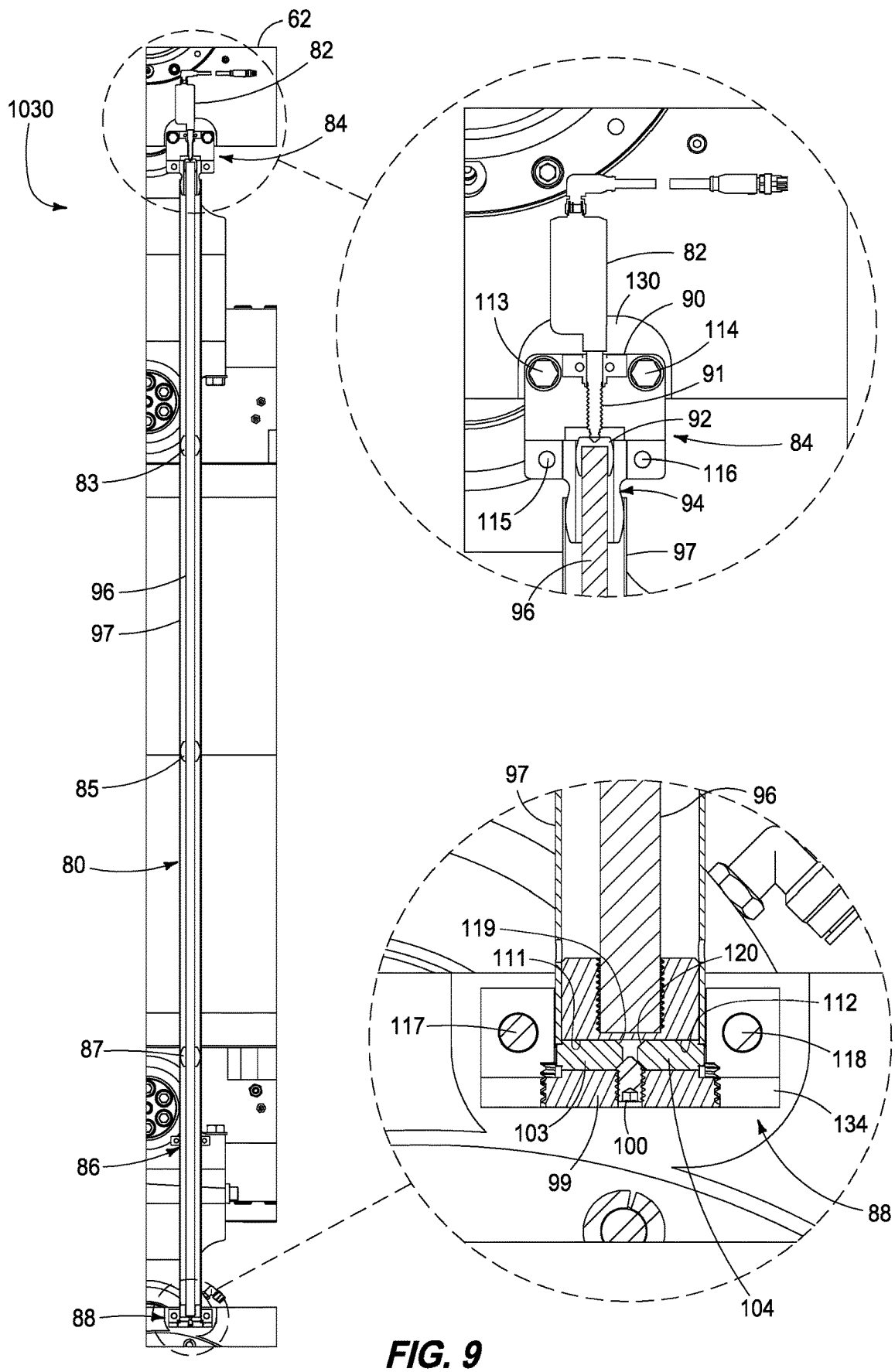
FIG. 9 is vertical centerline sectional view through the deformation assembly of FIG. 8 shown in same view.

FIG. 9 depicts details of sensor assembly 80 of deformation sensing apparatus 1030 in FIG. 8 taken in vertical centerline sectional view taken view through tube 97. More particularly, carbon fiber rod 96 is supported coaxially within an inner cylindrical wall of tube 97 supported for movement at a bottom end by mounting bracket 88. A remaining upwardly extending portion of carbon fiber rod 96 is supported within stainless steel tube 97 so as to allow free axial movement while restraining any significant lateral movement or bending in order to maintain axial positioning of rod 96 relative to tube 97 and frame 62. More particularly, a plurality of Nylatron® spherical bushing rod guides 83, 85 and 87 each have an inner bore sized to provide a snug fit with an outer surface of rod 97 and an outer bore sized to provide a sliding fit with an inner surface of tube 97. A cylindrical two-piece hand clamp collar made from a pair of semi-circular collars bolt together with threaded fasteners (not shown) to securely affix to tube 97 so as to provide a grip or handle for manipulating tube 97 during adjustment. A top end of tube 97 is secured with mounting bracket 84 to frame 62. Mounting bracket 84 also supports linear sensor 82 in a manner that enables measurement of differences in length rod 96 relative to the top and bottom positions of frame 62 where brackets 84 and 88 are affixed. Rod 96 is freely supported within tube 97 except for the bottom end which is fixed.

Top encircled region of FIG. 9 shows details of displacement sensor 82 as affixed to clamp base 130 of mounting bracket 84 via collet, or clamp collar 90 and threaded fasteners 113 and 114. An axially slidable and forward sprung measuring tip 91 on sensor 82 is contained in a flexible rubber bellows to prevent any dirt from obstructing the sliding relationship of the pin with the respective housing of sensor 82 so that the tip maintains accurate contact with a stainless steel top cap 92 that is affixed with epoxy adhesive atop rod 96. A light dimple, or recess is provided in a top surface of cap 92 configured to receive an end of the tip on sensor 82. Movement of such tip relative to cap 92 detects any change in distance there between as carbon fiber rod 96 is not loaded by any external forces, and carbon fiber is more thermally stable that the steel used to make frame 62 and associated driving components. Accordingly, sensor 82, cap 92 and rob 96 enable a control system to detect even dimensional changes in frame 62 (and related driving components) resulting from temperature changes within a processing plant that correct with formation of gaps between the contact surfaces of a pair of mating thermoforming die plates. Hence, a corrective, or remediative counter force, or displacement can be applied by SASH 12 (see FIG. 1) to close such gap before pressurized air (or vacuum) is applied between the die plates during a thermoforming operation. Cap 92 has a spherical outer diameter that is sized to be slidably received within an inner bore of alignment guide 94 and fasteners 115 and 115 are used to secure alignment guide 94 to clamp base 130. In this manner, guide 94 keeps rod 96 concentric within tube 97 while slip enabling rod 96 to move vertically as the frame 62 stretches or changes geometry from loads, including thermal loads and changes to shape.

Bottom encircled region of FIG. 9 illustrates how a bottom end of carbon fiber rod 96 is affixed to lower mounting bracket 88. More particularly, a steel threaded adjustment nut 99 is affixed with epoxy adhesive to a bottom end of rod 96 where it is inserted into a concentric cylindrical bore. An exposed outer periphery of nut 99 has male threads that engage with female threads within a bore in clamp base 134 in assembly. A pair of radially extending cylindrical bores 111 and 112 are provided in alignment nut 99 sized to slidably receive lock pins 103 and 104. Each pin 103 and 10 has a beveled radial inner end and a reduced diameter outer end. a threaded set screw 100 enables retraction and radial outward extension and locking of pins 103 and 104 when rotating nut 99 and rod 96 relative to the female threaded bore in clamp base 134. This enables length adjustment of rod 96 relative to lower bracket 88 and frame 62. Bracket 88 is rigidly and securely affixed via clamp base 134 and fasteners 117 and 118 to frame 62. Outer ends of pins 103 and 104 are extend into bores in tube 97 where they are locked with threaded set screw 100 to secure axial positioning of rod 96 relative to nut 99 and frame 62.

Figure 10:
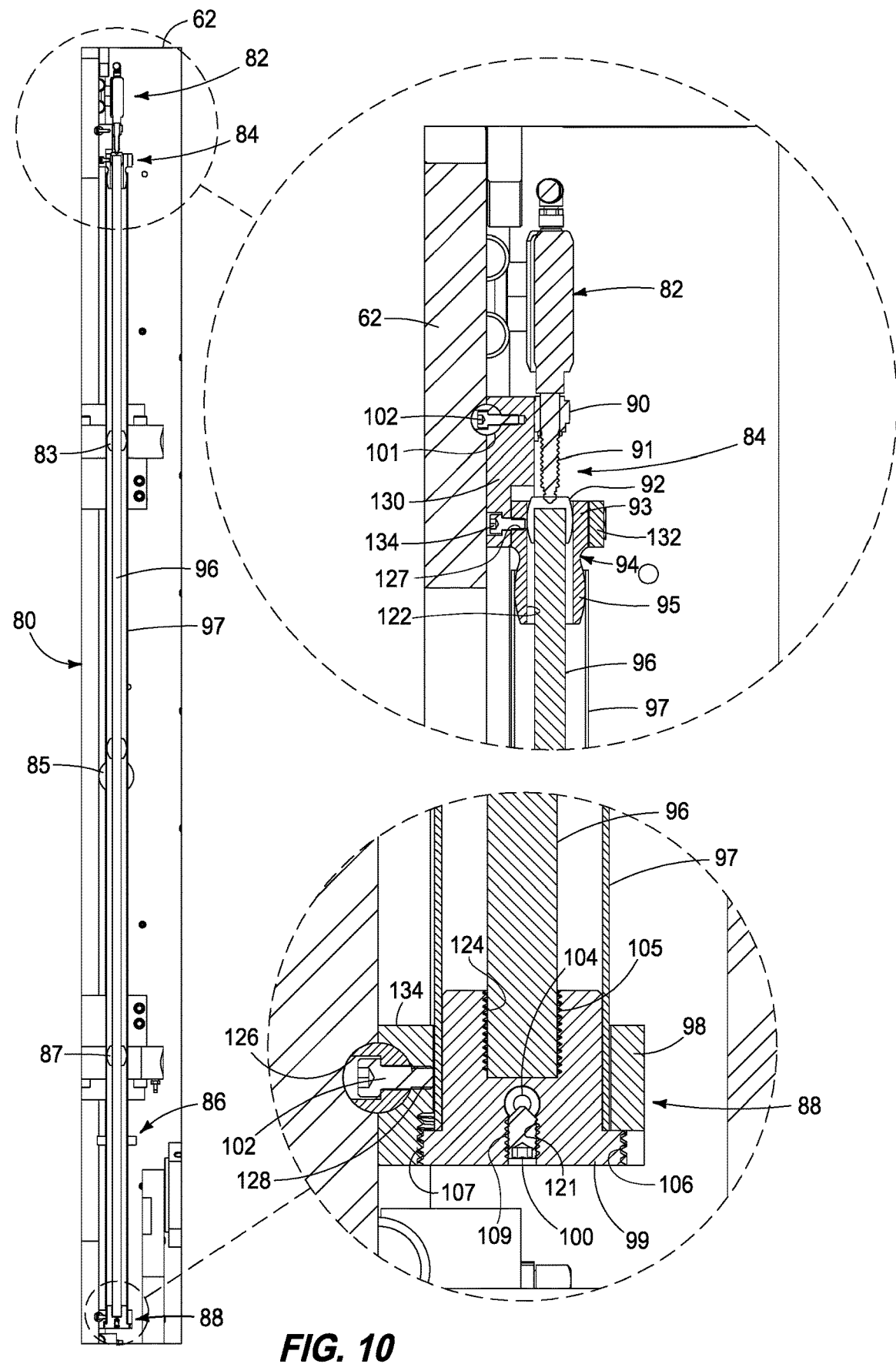
FIG. 10 is a vertical upstream side centerline sectional view of the deformation sensor assembly of FIG. 8.

FIG. 10 is a vertical upstream side centerline sectional view of the deformation sensor assembly 80 of apparatus 1030 of FIG. 8. More particularly, carbon fiber rod 96 is carried within tube 97 supported for free axial movement via bushings 83, 85, and 87 while mounting bracket 88 secures a bottom end to frame 92 while mounting bracket 84 freely supports an upper end of rod 96 against tip 91 while securely supporting sensor 82 to frame 62. Handle 86 enables gripping of tube 97 when rotating tube 97 and rod 96 when rotating nut 99 during length adjustment of sensing apparatus 80.

Top encircled region of FIG. 10 shows sensor 82 rigidly affixed via collet 90 to mounting plate 130 and frame 62. A hardened steel cylindrical keyway pin 101 is received in a cylindrical recess in a back surface of mounting plate 130 with a threaded fastener 102. A complementary cylindrical keyway recess is formed in frame 62 to enable precise and repeated locating of sensor 82 and bracket 84 onto frame 62 in assembly. A threaded fastener, or bolt 134 is used to affix alignment guide 94 to clamp base 130 and frame 62, in assembly, via a threaded bore 127. Oversized bore 122 in guide 94 enables free axial movement of carbon fiber rod 96 relative to tube 97 and guide 94, as spherical end of cap 92 is also sized to freely slide in bore 122. Pin 122 is sprung into engagement with a top surface of cap 92 to enable measurement of frame deformation by comparing changes in distance relative to thermally stable and unloaded carbon fiber rod 96 and end cap 92. Clamp 132 affixes guide 94 to clamp base 130 at cylindrical portion 93 while enlarged head 95 further enables axial sliding of tube 97.

Bottom encircled region of FIG. 10 illustrates epoxy adhesive 105 affixing bottom end of rod 96 in a cylindrical bore 124 of nut 99. Female threads 106 enable adjustment with male threads 107 to adjust axial positioning of rod 96 and tube 97 relative to clamp base 134 of bracket 88 and collar 98. Set screw 100 is shown securing pin 104 in a locked position, ensuring no rotation between thread 106 and 107 after length has been properly adjusted. Set screw 100 has male threads 109 received in complementary female threads 121 in nut 99. Finally, a hardened steel cylindrical keyway pin 126 is received in a cylindrical recess in a back surface of nut 134 with a threaded fastener 102 received into a threaded bore 128 in nut 134. A complementary cylindrical keyway recess is formed in frame 62 to enable precise and repeated locating of bracket 84 and rod 96 onto frame 62 in assembly.

The Measuring System contains one or more measuring devices comprised of a carbon fiber rod attached to the top and bottom of the frame and a linear transducer measuring device. See FIG. 2. The Measuring System can use one measuring device on the entrance side of the frame. It is also possible to use two measuring devices; one on each side of the frame. It is also possible to use four measuring devices; one on each corner of the frame. See FIGS. 3-5 for various Measuring System configurations.

Carbon fiber was chosen as the material for the measuring device rod 96 because of its high thermal stability and strength. However, other suitable thermally stable materials could be use. Because of the temperatures being generated from the thermoforming process and the resolution and precision of the measurements, it is important to have a material that is stable and does not deform under temperature changes. The rods 96 are fixed to the bottom mount 88 and float at the top mount 84. A linear transducer 82 is attached to the top mount 84, above each rod 96. The linear transducer being used is a Keyence GT2-H12(K), available from KEYENCE CORPORATION OF AMERICA, 500 Park Boulevard, Suite 200, Itasca, Ill. 60143, U.S.A. Since the carbon fiber rod 96 is fixed on the bottom end and floating on the top end, the linear transducer measures the displacement in the rod as the frame deflects under form air pressure.

The top of the carbon fiber rod 96 is fitted with a stainless steel cap 92 that seats the linear transducer indicator contact point. The cap 92 is 304 stainless steel to prevent rust from building up and affecting the accuracy of the transducer s measurement. The Keyence GT2-H12(K) linear transducer comes with a threaded adjustable mount for setting the initial height of the transducer. On the fixed bottom mount 88, the carbon fiber rod 96 is attached to a threaded adjust nut 134. The threaded adjust nut 134 allows for fine adjustments in a convenient location (at the bottom of the frame instead of the top) and allows the user to adjust the height of the Measuring System while viewing the Thermoformer control module. The Measuring System uses one or more Nylatron® guides 83, 85, and 87 between the carbon fiber rod 96 and the stainless steel housing, or tube 97 to ensure the rod 96 stays straight and centered. There is also a fixed alignment guide 94 located at the top mount that keeps the rod 96 concentric with the linear transducer 82 while still allowing the rod 96 to move vertically as the frame stretches.

In order to find the deflection of the overall components of thermoforming machine 1010, a scaling factor had to be determined. Since the measuring system 1030 (or 30 of FIG. 1) is only attached to the frame, it is only measuring the deflection in the frame 62 alone. The measuring system 1030 is not taking into consideration the deflection in the platens, rod ends, and toggles. To compensate for this, finite element analysis (FEA) simulations are used to determine the deflection of frame 62 at a given tonnage of form air pressure and compare it to the overall deflection of the thermoforming machine 1010 at the same tonnage. With these values, we can observe a fairly accurate linear relationship between the deflection in the frame 62 and the overall deflection of all components in the thermoforming machine 1010. At maximum tonnage, the deflection of frame 62 was measured at 0.0216", but the overall deflection measured between the platens 18 and 20 was 0.2700". This gives us a scaling factor of 12.5. The resolution of the Keyence GT2-H12(K) linear transducer is 0.000004". Using our scaling factor of 12.5, it can be concluded that every 0.000004" of deflection measured by the linear transducer will equate to approximately 0.00005" of deflection between the platens. Note, the FEA simulation data and scaling factor is a "starting point" and real-life measurements on the machine will need to be conducted to confirm these values.

The feedback from the measuring system allows the thermoforming machine 1010 to detect deviation from its set point. The feedback from the measuring system can also be used in parallel with other thermoforming technology. With one measuring device, a user is able to detect the variation from the set point. With two measuring devices, a user can detect the variation from the set point and better detect the deviation from side to side. With four measuring devices at each corner, a user is able to detect the variation from the set point, detect deviation from side to side, and measure the difference in deflection from corner to corner. For most thermoforming applications, one measuring device would be more than adequate for measuring how much a frame stretches.

While the subject matter of this application was motivated in addressing flatness and sealing between die plates when forming using high forming loads, such as loads generated when using forming pressure, or air to help form articles during a thermoforming operation, it is in no way so limited. The disclosure is only limited by the accompanying claims as literally worded, without interpretative or other limiting reference to the specification, and in accordance with the doctrine of equivalents.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

In compliance with the statute, the various embodiments have been described in language more or less specific as to structural and methodical features. It is to be understood, however, that the various embodiments are not limited to the specific features shown and described, since the means herein disclosed comprise disclosures of putting the various embodiments into effect. The various embodiments are, therefore, claimed in any of its forms or modifications within the proper scope of the appended claims appropriately interpreted in accordance with the doctrine of equivalents.

What is claimed is:

1. A thermoforming apparatus, comprising:
  a pair of coacting platens and respective dies configured to mate on opposed surfaces of a heated sheet of intermittently moved, continuous thermoformable material to form articles;
  a frame including at least one frame leg configured to carry the coacting platens and the dies for reciprocation in complementary closed relationship about the sheet during an article forming operation;
a drive assembly carried by the frame and configured to impart a forming load between the pair of opposed dies and platens and generate a resisting counter load across the frame leg during a forming operation; and
a deformation sensor configured proximate one of the frame legs in a non load-bearing configuration from forming loads, spanning a majority of a distance along the frame leg encompassing the drive assembly, the dies and the platens and configured to span a spaced apart distance between a first location and a second location on the frame proximate the frame leg to detect deformation of the frame leg from loads on the frame, the sensor comprising a material that is more thermally stable for material dimensional changes relative to a material forming the frame leg and configured to detect deformation of the frame between the first location and the second location.

2. The apparatus of claim 1, wherein the deformation sensor is affixed at one end to the first location and at another end to the second location, the first location proximate a coupling between one platen and respective one die and the second location proximate a coupling between another platen and respective another die.

3. The apparatus of claim 1, wherein the deformation sensor comprises an elongate rod affixed at one end to the frame at the first location and a displacement sensor communicating with another end of the elongate rod affixed to the frame at the second location.

4. The apparatus of claim 3, wherein the sensor comprises a linear variable differential transformer (LVDT) sensor.

5. The apparatus of claim 3, wherein the elongate rod comprises a thermally stable material.

6. The apparatus of claim 5, wherein the elongate rod is a carbon fiber rod.

7. The apparatus of claim 1, wherein the detected deformation from the sensor is elastic deformation of at least one of the frame, the platens, the dies, and the drive mechanism responsive to a differential closing load.

8. The apparatus of claim 1, wherein the frame comprises a rectangular array of four parallel frame legs, and a pair of deformation sensors are provided, one on each side of the frame.

9. A thermoforming apparatus, comprising:
a thermoformer frame having a load path configured to carry a forming load between a first location and a second location and across a counteracting load path;
a pair of mating reciprocating platens and dies respectively provided between the first location and the second location and configured to engage with opposed faces of an intermittently moved, continuous heated web of thermoformable material; and
a sensor carried across the load path and configured proximate a frame leg of the frame in a non load-bearing configuration from forming loads spanning a majority of a distance along the frame leg encompassing the drive assembly, the dies and the platens to detect deformation between the first location and the second location from loads imparted during a forming operation comprising a material that is more thermally stable for material dimensional changes relative to a material forming the frame leg and configured to detect deformation of the frame between the first location and the second location.

10. The thermoforming apparatus of claim 9, wherein the detected deformation is elastic deformation of at least one of the frame, the platens, the dies, and the drive mechanism responsive to the differential closing load.

11. The thermoforming apparatus of claim 9, wherein the load path is a frame leg of the thermoformer frame.

12. The thermoforming apparatus of claim 11, wherein a plurality of sensors are provided spaced apart on opposed sides of the frame.

13. The thermoforming apparatus of claim 11, wherein four sensors are provided spaced apart on each corner of the frame.

14. The thermoforming apparatus of claim 9, wherein the sensor comprises a thermally stable elongate rod affixed to one of a first frame location and a second frame location and a linear displacement detector interposed between another of the first frame location and the second frame location configured to detect displacement between a distal end of the elongate rod and the second frame location.

15. A thermoforming apparatus, comprising:
a thermoformer frame having a plurality of mounting locations configured to carry reciprocating die and platen drive assemblies intermittently moved to engage a continuous heated sheet of thermoformable material to form articles, the frame subjected to one of:
a) thermal material geometry changes, and
b) load bearing deformations from forming loads that impart deformation to the frame; and
a sensor assembly including a displacement sensor and an elongate rod, the displacement sensor affixed to the frame at one location and the elongate rod affixed to the frame at another location in a non load-bearing configuration from forming loads and spaced from the one location encompassing the carried reciprocating die and platen drive assemblies and extending proximate the one location spanning a majority of a distance along the frame between the one location and the another location to engage with the displacement sensor and comprising a material that is more thermally stable for material dimensional changes than a material forming the frame member and configured to detect deformation of the frame between the one location and the another location from loads imparted to the frame during a forming operation.

16. The thermoforming apparatus of claim 15, wherein the thermoforming frame has a set of four spaced-apart first mounting locations and a set of four spaced-apart second mounting locations, and a pair of sensor assemblies are provided each extending between the respective first mounting location and the second mounting location.

17. The thermoforming apparatus of claim 16, wherein individual ones of the pair of sensor assemblies are provided on opposed sides of the thermoforming frame each extending from a top frame member to a bottom frame member.

18. The thermoforming apparatus of claim 15, wherein the elongate rod comprises a carbon fiber rod and the frame comprises steel, the elongate rod having a thermal dimensional stability for the material geometry greater than thermal dimensional stability for the frame.

19. The thermoforming apparatus of claim 18, wherein the physical displacement sensor comprises a linear variable differential transformer (LVDT) sensor.

20. A thermoforming apparatus, comprising:
a pair of coacting platens and dies configured to mate in opposition about a heated sheet of thermoformable material;
a frame having at least one frame leg configured to support the coacting platens and the dies; a drive assembly carried by the frame and configured to impart a forming load between the coacting platens and the dies when closed against the heated sheet and a counteracting frame load on the at least one frame leg; and a deformation sensor substantially spanning a length of one of the at least one frame legs and supported by the frame in a non load-bearing configuration from forming loads between a first location and a second location on the frame proximate the frame leg, the sensor comprising a material having a first thermal stability and the frame leg comprising a material having a second thermal stability less than the first thermal stability and the sensor configured to detect dimensional changes of the frame between the first location and the second location.

21. The thermoforming apparatus of claim 20, wherein the deformation sensor comprises a carbon fiber elongate element spanning a substantial distance between the first location and the second location on the frame.

22. The thermoforming apparatus of claim 21, wherein the deformation sensor further comprises a linear variable differential transformer (LVDT) communicating in engagement with the carbon fiber elongate element and configured to detect relative changes in length between the carbon fiber elongate element and the frame leg, between the first location and the second location.

23. The thermoforming apparatus of claim 22, wherein the LVDT is configured to be urged into engagement with one end of the carbon fiber elongate element.

24. The thermoforming apparatus of claim 20, wherein the deformation sensor comprises a steel tube and a carbon fiber rod supported for free axial movement within the tube.

25. The thermoforming apparatus of claim 24, wherein the sensor further comprises at least one bushing supported by one of: a) the carbon fiber rod and b) the steel tube, for free axial movement relative to another of: a) the carbon fiber rod and b) the steel tube, to restrict any significant lateral movement or bending of the carbon fiber rod within the steel tube.

26. The thermoforming apparatus of claim 24, wherein the deformation sensor further comprises a linear variable differential transformer (LVDT) having a sprung measuring tip and an end cap affixed to one end of the carbon fiber rod having a receiver portion and the linear variable differential transformer (LVDT) is configured to communicate in engagement at the tip with the cap on the carbon fiber rod.

27. The thermoforming apparatus of claim 20, further comprising a control system having processing circuitry and memory coupled with the deformation sensor, and the drive assembly having a servo drive motor coupled with the control system, the control system configured to receive a detected input signal from the deformation sensor and generate an output signal to the servo drive motor.

28. The thermoforming apparatus of claim 27, wherein the output signal is indicative of correlated elastic and/or plastic deformation of the frame, bearings, linkages, platens, and dies indicative of deformation from one or more of thermal material geometry changes and elastic and/or plastic load deformation.

* * * * *